United States Patent
Hao

(10) Patent No.: US 11,490,303 B2
(45) Date of Patent: Nov. 1, 2022

(54) CELL HANDOVER METHOD AND APPARATUS, RRC REESTABLISHMENT METHOD AND APPARATUS, STORAGE MEDIUM AND USER EQUIPMENT

(71) Applicant: SPREADTRUM COMMUNICATIONS (SHANGHAI) CO., LTD., Shanghai (CN)

(72) Inventor: Yutai Hao, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/266,350

(22) PCT Filed: Jun. 26, 2019

(86) PCT No.: PCT/CN2019/093015
§ 371 (c)(1),
(2) Date: Feb. 5, 2021

(87) PCT Pub. No.: WO2020/029701
PCT Pub. Date: Feb. 13, 2020

(65) Prior Publication Data
US 2021/0314833 A1 Oct. 7, 2021

(30) Foreign Application Priority Data
Aug. 10, 2018 (CN) .......................... 201810909608.4

(51) Int. Cl.
*H04W 36/00* (2009.01)
*H04W 36/08* (2009.01)

(52) U.S. Cl.
CPC .. *H04W 36/00837* (2018.08); *H04W 36/0011* (2013.01); *H04W 36/08* (2013.01)

(58) Field of Classification Search
CPC ............. H04W 36/08; H04W 36/0011; H04W 36/00837
(Continued)

(56) References Cited

U.S. PATENT DOCUMENTS

| 2013/0182563 A1 | 7/2013 | Johansson et al. |
| 2013/0183974 A1 | 7/2013 | Johansson et al. |

(Continued)

FOREIGN PATENT DOCUMENTS

| CN | 103348733 A | 10/2013 |
| CN | 103763730 A | 4/2014 |

(Continued)

OTHER PUBLICATIONS

Ericsson, "On Reliability, overhead and controllability aspects of Conditional Handover", 3rd Generation Partnership Project, 3GPP TSG-RAN WG2 #101; Dated (February 26-Mar. 2, 2018) R2-1803338, 4 pages.

(Continued)

*Primary Examiner* — Joel Ajayi
(74) *Attorney, Agent, or Firm* — Cantor Colburn LLP

(57) ABSTRACT

Cell handover method and apparatus, RRC reestablishment method and apparatus, medium and UE are provided. The cell handover method includes: receiving conditional handover command information from a base station, wherein the conditional handover command information includes a handover trigger condition, selecting a target cell from a plurality of candidate target cells that satisfy the handover trigger condition based on priority information, wherein the priority information includes priority levels of the plurality of candidate target cells; and performing a cell handover operation from a current serving cell to the target cell. The RRC reestablishment method includes: if RRC reestablishment is triggered, performing cell selection, and determining (Continued)

a target access cell from a plurality of cells searched in the cell selection based on priority information, and performing the RRC reestablishment in the target access cell, wherein the priority information includes priority levels of the plurality of cells used for conditional handover.

11 Claims, 2 Drawing Sheets

(58) Field of Classification Search
USPC .................................................. 455/436–448
See application file for complete search history.

(56) References Cited

U.S. PATENT DOCUMENTS

| | | | |
|---|---|---|---|
| 2014/0120921 A1* | 5/2014 | Keskitalo | H04W 36/305 455/438 |
| 2015/0085829 A1 | 3/2015 | Bawaskar | |
| 2015/0245405 A1 | 8/2015 | Johansson et al. | |
| 2015/0245406 A1 | 8/2015 | Johansson et al. | |
| 2015/0245407 A1 | 8/2015 | Johansson et al. | |
| 2017/0055192 A1 | 2/2017 | Johansson et al. | |
| 2018/0176710 A1 | 6/2018 | Jang et al. | |
| 2019/0387438 A1 | 12/2019 | Chang et al. | |
| 2020/0045602 A1 | 2/2020 | Jiang | |

FOREIGN PATENT DOCUMENTS

| | | |
|---|---|---|
| CN | 107113673 A | 8/2017 |
| CN | 108243468 A | 7/2018 |
| EP | 2887740 A1 | 6/2015 |
| WO | 2019195060 A1 | 10/2019 |

OTHER PUBLICATIONS

Ericsson, "On Reliability, overhead and controllability aspects of Conditional Handover"; 3rd Generation Partnership Project, 3GPP TSG-RAN WG2 #99; Dated (Aug. 21-25, 2017) R2-1708576, 2 pages.

Ericsson, "On Reliability, overhead and controllability aspects of Conditional Handover"; 3rd Generation Partnership Project, 3GPP TSG-RAN WG2#100; Dated (November 27-Dec. 1, 2017) R2-1713608; 5 pages.

Ericsson, "On Reliability, overhead and controllability aspects of Conditional Handover"; 3rd Generation Partnership Project, 3GPP TSG-RAN WG2NRAH#1801; Dated (Jan. 22-26, 2018) R2-1801331; 4 pages.

International Search Report for International Application No. PCT/CN2019/093015; dated Sep. 29, 2019.

CNIPA First Office Action for corresponding CN Application No. 201810909608.4; dated Jul. 2, 2020.

EPO Extended European Search Report for corresponding EP Application No. 19847120.3; dated Mar. 3, 2022.

* cited by examiner

CELL HANDOVER METHOD AND APPARATUS, RRC REESTABLISHMENT METHOD AND APPARATUS, STORAGE MEDIUM AND USER EQUIPMENT

CROSS-REFERENCE TO RELATED APPLICATIONS

This is the U.S. national stage of application No. PCT/CN2019/092015 filed on Jun. 26, 2019. Priority under 35 U.S.C. § 119(a) and 35 U.S.C. § 365(b) is claimed from Chinese Application No. 201810909608.4, filed Aug. 10, 2018, the disclosure of which is also incorporated herein by reference.

TECHNICAL FIELD

The present disclosure generally relates to radio communication technology field, and more particularly, to a cell handover method and apparatus, a Radio Resource Control (RRC) reestablishment method and apparatus, a storage medium and a User Equipment (UE).

BACKGROUND

The 5th Generation Core network (5GC) includes Access and Mobility Management Function (AMF) elements and User Plane Function (UPF) elements. Next Generation Radio Access Network (NG-RAN) includes gNB (representing 5G base station) or ng-eNB (representing 4G base station node that can access 5GC). The ng-eNB and a terminal communicate through a protocol stack of Evolved UMTS Terrestrial Radio Access Network (E-UTRAN), and the gNB and a terminal communicate through a protocol stack of New Radio (NR) technology. NR refers to the new generation of air interface access technology, i.e., 5G air interface access technology.

In existing techniques, in an NR system, a network side may transmit conditional handover command information to a UE, and the UE receives the conditional handover command information from the network side, and performs a handover operation when a condition for triggering the handover is met. The conditional handover command information refers to content, such as conditional information for triggering the handover, configured on the network side.

However, during conditional handover, a source base station managing the UE may prepare for handover with multiple target base stations, and the conditional handover command information transmitted to the UE includes multiple target cells. If multiple target cells meet the handover condition, how to select one target cell for handover is a problem to the UE.

SUMMARY

Embodiments of the present disclosure enable to select an optimal target cell during cell handover, which may improve handover efficiency.

In an embodiment of the present disclosure, a cell handover method is provided, including: receiving conditional handover command information from a base station, wherein the conditional handover command information includes a handover trigger condition; selecting a target cell from a plurality of candidate target cells that satisfy the handover trigger condition based on priority information, wherein the priority information includes priority levels of the plurality of candidate target cells; and performing a cell handover operation from a current serving cell to the target cell.

Optionally, the conditional handover command information includes the priority information, and the priority information includes identities and corresponding priority levels of the plurality of candidate target cells, or frequencies and corresponding priority levels of the plurality of candidate target cells.

Optionally, before selecting a target cell from a plurality of candidate target cells that satisfy the handover trigger condition based on priority information, the method further includes: receiving RRC signaling from the base station, wherein the RRC signaling includes the priority information.

Optionally, before selecting a target cell from a plurality of candidate target cells that satisfy the handover trigger condition based on priority information, the method further includes: determining the priority information based on signal quality of the plurality of candidate target cells.

Optionally, determining the priority information based on signal quality of the plurality of candidate target cells includes: determining the priority levels of the plurality of candidate target cells based on absolute signal quality of the plurality of candidate target cells, wherein the higher the absolute signal quality of the candidate target cell, the higher the priority level of the candidate target cell; or determining the priority levels of the plurality of candidate target cells based on differences between signal quality of the plurality of candidate target cells and a signal threshold indicated by the handover trigger condition, wherein the greater the difference corresponding to the candidate target cell, the higher the priority level of the candidate target cell; or determining the priority levels of the plurality of candidate target cells based on numbers of beams whose signal quality exceeds a preset threshold in the plurality of candidate target cells, wherein the greater the number of beams corresponding to the candidate target cell, the higher the priority level of the candidate target cell.

Optionally, before selecting a target cell from a plurality of candidate target cells that satisfy the handover trigger condition based on priority information, the method further includes: determining the priority levels of the plurality of candidate target cells based on remaining durations of timers in the conditional handover command information, wherein the longer the remaining duration, the higher the priority level of the candidate target cell.

In an embodiment of the present disclosure, an RRC reestablishment method is provided, including: if RRC reestablishment is triggered, performing a cell selection procedure; and determining a target access cell from a plurality of cells searched in the cell selection procedure based on priority information, and performing the RRC reestablishment in the target access cell, wherein the priority information includes priority levels of the plurality of cells used for conditional handover.

In an embodiment of the present disclosure, a cell handover apparatus is provided, including: a conditional handover command receiving circuitry configured to receive conditional handover command information from a base station, wherein the conditional handover command information includes a handover trigger condition; a target cell determining circuitry configured to select a target cell from a plurality of candidate target cells that satisfy the handover trigger condition based on priority information, wherein the priority information includes priority levels of the plurality of candidate target cells; and a handover circuitry configured to perform a cell handover operation from a current serving cell to the target cell.

Optionally, the conditional handover command information includes the priority information, and the priority information includes identities and corresponding priority levels of the plurality of candidate target cells, or frequencies and corresponding priority levels of the plurality of candidate target cells.

Optionally, the cell handover apparatus further includes a priority information receiving circuitry configured to receive RRC signaling from the base station, where the RRC signaling includes the priority information.

Optionally, the cell handover apparatus further includes a priority information determining circuitry configured to determine the priority information based on signal quality of the plurality of candidate target cells.

Optionally, the priority information determining circuitry includes: a first priority level determining sub-circuitry configured to determine the priority levels of the plurality of candidate target cells based on absolute signal quality of the plurality of candidate target cells, wherein the higher the absolute signal quality of the candidate target cell, the higher the priority level of the candidate target cell; a second priority level determining sub-circuitry configured to determine the priority levels of the plurality of candidate target cells based on differences between signal quality of the plurality of candidate target cells and a signal threshold indicated by the handover trigger condition, wherein the greater the difference corresponding to the candidate target cell, the higher the priority level of the candidate target cell; or a third priority level determining sub-circuitry configured to determine the priority levels of the plurality of candidate target cells based on numbers of beams whose signal quality exceeds a preset threshold in the plurality of candidate target cells, wherein the greater the number of beams corresponding to the candidate target cell, the higher the priority level of the candidate target cell.

Optionally, the cell handover apparatus further includes a priority level determining circuitry configured to determine the priority levels of the plurality of candidate target cells based on remaining durations of timers in the conditional handover command information, wherein the longer the remaining duration, the higher the priority level of the candidate target cell.

In an embodiment of the present disclosure, an RRC reestablishment apparatus is provided, including: a cell selection circuitry configured to perform a cell selection procedure if RRC reestablishment is triggered; and a target access cell determining circuitry configured to determine a target access cell from a plurality of cells searched in the cell selection procedure based on priority information, and perform the RRC reestablishment in the target access cell, wherein the priority information includes priority levels of the plurality of cells used for conditional handover.

In an embodiment of the present disclosure, a storage medium having computer instructions stored therein is provided, wherein when the computer instructions are executed, the cell handover method or the RRC reestablishment method is performed.

In an embodiment of the present disclosure, a UE including a memory and a processor is provided, wherein the memory has computer instructions stored therein, and when the processor executes the computer instructions, the cell handover method or the RRC reestablishment method is performed.

Embodiments of the present disclosure may provide following advantages.

In an embodiment of the present disclosure, conditional handover command information is received from a base station, wherein the conditional handover command information includes a handover trigger condition, a target cell is selected from a plurality of candidate target cells that satisfy the handover trigger condition based on priority information, wherein the priority information includes priority levels of the plurality of candidate target cells, and a cell handover operation is performed from a current serving cell to the target cell. In the embodiment, when the UE performs cell handover in response to the command of the base station, if there are a plurality of candidate target cells meeting the trigger condition, the final target cell for cell handover may be determined based on the priority levels of the plurality of target cells, and the final target cell may be the target cell with the highest priority level, so as to ensure that the UE can be handed over to an optimal target cell, which may avoid frequent handovers of the UE, improve efficiency of cell handover, and ensure communication quality.

Further, the conditional handover command information includes the priority information, or the UE receives from the base station the RRC signaling which includes the priority information. In the embodiment, the priority information may be carried in the conditional handover command information, and the UE can obtain the priority information while obtaining the trigger condition, thereby ensuring convenience of obtaining the priority information. Alternatively, the UE may obtain the priority information through independent RRC signaling to ensure accuracy and timeliness of obtaining the priority information.

Further, if the RRC reestablishment is triggered, a cell selection procedure is performed, a target access cell is determined from a plurality of cells searched in the cell selection procedure based on priority information, and the RRC reestablishment is performed in the target access cell, wherein the priority information includes priority levels of the plurality of cells used for conditional handover. In the embodiment, the UE may also refer to the priority information when performing RRC reestablishment, that is, determining the target access cell from the plurality of cells searched in the cell selection procedure based on priority information as an optimal target cell for handover, and performing the RRC reestablishment in the target access cell, thereby improving a success rate of RRC reestablishment, and avoiding frequent handovers.

DETAILED DESCRIPTION

As described in the background, during conditional handover, a source base station managing the UE may prepare for handover with multiple target base stations, and the conditional handover command information transmitted to the UE includes multiple target cells. If multiple target cells meet the handover condition, how to select one target cell for handover is a problem to the UE.

In the embodiment, when the UE performs cell handover in response to the command of the base station, if there are a plurality of candidate target cells meeting the trigger condition, the final target cell for cell handover may be determined based on the priority levels of the plurality of target cells, and the final target cell may be the target cell with the highest priority level, so as to ensure that the UE can be handed over to an optimal target cell, which may avoid frequent handovers of the UE, improve efficiency of cell handover, and ensure communication quality.

Embodiments of the present disclosure may be applied to 5G communication systems, 4G communication systems, or other various communication systems in subsequent evolution.

In order to clarify the objects, characteristics and advantages of the disclosure, embodiments of present disclosure will be described in detail in conjunction with accompanying drawings.

Figure 1:
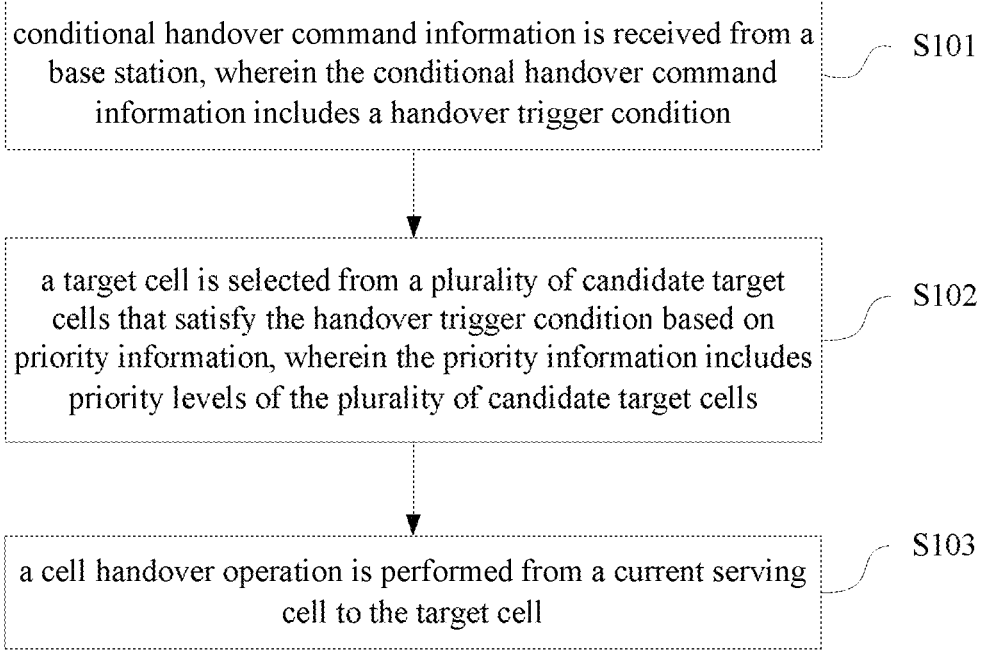
FIG. 1 is a flow chart of a cell handover method according to an embodiment.

FIG. 1 is a flow chart of a cell handover method according to an embodiment.

The method may be applied at a UE side, and may include S101, S102 and S103.

In S101, conditional handover command information is received from a base station, wherein the conditional handover command information includes a handover trigger condition.

In S102, a target cell is selected from a plurality of candidate target cells that satisfy the handover trigger condition based on priority information, wherein the priority information includes priority levels of the plurality of candidate target cells.

In S103, a cell handover operation is performed from a current serving cell to the target cell.

In some embodiments, the base station may transmit conditional handover command information to the UE, and the UE may perform cell handover in response to the conditional handover command information. Specifically, the base station may carry the conditional handover command information in an RRC message transmitted to the UE. More specifically, the RRC message may be an RRC reconfiguration message.

The conditional handover command information may include a handover trigger condition. When a cell satisfies the handover trigger condition, the UE may initiate a cell handover to the cell, that is, to perform random access to the cell. The handover trigger condition may include that signal quality of the target cell meets a first preset threshold and/or signal quality of a serving cell meets a second preset threshold (the second preset threshold is less than the first preset threshold), and one or more offset thresholds of a measurement event, for example, an offset threshold of an A3 event threshold, which may be an offset threshold 3 dB higher than the A3 event threshold.

Further, the conditional handover command information may include handover trigger conditions of a plurality of candidate target cells, that is, there may be a plurality of candidate target cells that satisfy corresponding handover trigger conditions. In this case, the UE may select the target cell based on the priority information. Specifically, the candidate target cell with the highest priority level may be determined as the target cell.

In S103, the UE may perform a cell handover operation to the target cell.

In some embodiments, the priority information may be obtained by the UE from the base station, or may be calculated by the UE based on signal quality of the plurality of candidate target cells. A specific calculation method may be pre-appointed, for example, specified by a communication standard protocol.

It should be noted that before the base station transmits the conditional handover command information to the UE, a source base station and one or more target base stations perform handover preparation for the UE, that is, a resource of the UE is prepared in the target base stations, where the resource may include resources such as time-frequency resources for random access of the UE during handover of the target cell.

In some embodiments, when the UE responds to the command of the base station to perform cell handover, and there are a plurality of candidate target cells that meet the trigger condition, the target cell for cell handover may be determined based on the priority levels of the plurality of candidate target cells. The target cell may be the candidate target cell with the highest priority level, thereby ensuring that the UE can be handed over to the optimal target cell, avoiding frequent handovers of the UE, improving efficiency of cell handover, and ensuring communication quality.

In some embodiments, the conditional handover command information includes the priority information which includes identities and corresponding priority levels of the plurality of candidate target cells, or frequencies and corresponding priority levels of the plurality of candidate target cells.

In some embodiments, the priority information may be carried in the conditional handover command information. The UE may obtain the priority information while obtaining the trigger condition, ensuring convenience of obtaining the priority information.

The priority information may include the identities and corresponding priority levels of the plurality of candidate target cells, or the frequencies and corresponding priority levels of the plurality of candidate target cells. The priority levels may be represented by numerical values, such as 1, 2, . . . 32, where 1 represents the highest priority, and 32 represents the lowest priority.

That is, the UE may directly select the target cell based on the priority levels of the plurality of candidate target cells. For example, the UE directly determines the candidate target cell with the priority level of 1 as the target cell.

Further, if there are multiple cells on the same frequency or on different frequencies with the same priority level, the candidate target cell with the highest signal quality may be selected as the target cell. In other words, candidate target cells on the same frequency or on different frequencies with the same priority level correspond to different priorities according to signal quality, where the higher the signal quality, the higher the priority.

It could be understood that the priority level may be represented in any other implementable manner, for example, English letters arranged in order, which is not limited in the embodiments of the present disclosure.

In some embodiments, a following step may be further performed before S102 as shown in FIG. 1: receiving RRC signaling from the base station, where the RRC signaling includes the priority information.

In the embodiments, the UE may obtain the priority information through independent RRC signaling to ensure the accuracy and timeliness of obtaining the priority information.

Specifically, the priority information may include the identities and corresponding priority levels of the plurality of candidate target cells, or the frequencies and corresponding priority levels of the plurality of candidate target cells.

Alternatively, in some embodiments, a following step may be further performed before S102 as shown in FIG. 1: determining the priority information based on signal quality of the plurality of candidate target cells.

In the embodiments, the UE does not obtain the priority information from the base station, but directly determines the priority information based on the signal quality of the plurality of candidate target cells, that is, determines the priority levels of the plurality of candidate target cells based on the signal quality of the plurality of candidate target cells, thereby avoiding signaling interaction between the UE and the base station to save signaling overhead.

It should be noted that a specific method for determining the priority information based on the signal quality of the cells may be pre-defined by a communication standard protocol, and the UE may directly determine the priority information based on the specific method.

Further, the priority levels of the plurality of candidate target cells may be determined based on absolute signal quality of the plurality of candidate target cells, where the higher the absolute signal quality of the candidate target cell, the higher the priority level of the candidate target cell.

Alternatively, the priority levels of the plurality of candidate target cells may be determined based on differences between the signal quality of the plurality of candidate target cells and a signal threshold indicated by the handover trigger condition, where the greater the difference corresponding to the candidate target cell, the higher the priority level of the candidate target cell.

Alternatively, the priority levels of the plurality of candidate target cells may be determined based on numbers of beams whose signal quality exceeds a preset threshold in the plurality of candidate target cells, where the greater the number of beams corresponding to the candidate target cell, the higher the priority level of the candidate target cell.

Alternatively, the priority levels of the plurality of candidate target cells may be determined based on remaining durations of timers in the conditional handover command information, where the longer the remaining duration, the higher the priority level of the candidate target cell.

In some embodiments, the UE may determine the priority information using one of the above-mentioned ways. Further, the base station may indicate one or more specific methods of determining the priority information for the UE.

Specifically, the difference between the signal quality of the candidate target cell and the signal threshold indicated by the handover trigger condition may be a positive value or a negative value. In some embodiments, if the signal quality of cell 1 exceeds the signal threshold indicated by the handover trigger condition by 2 dB, and the signal quality of cell 2 exceeds the signal threshold indicated by the handover trigger condition by 3 dB, the priority level of cell 2 is higher than that of cell 1.

The preset threshold may be a signal threshold indicated by the handover trigger condition, or may be another signal threshold configured on the network side, for example, a threshold value reported by a measurement event. In specific applications, if the number of beams exceeding the preset threshold in cell 1 is 2, and the number of beams exceeding the preset threshold in cell 2 is 3, the priority level of cell 2 is higher than that of cell 1.

In some embodiments, the conditional handover command information may include timer information, and the timer information may indicate a validity period to the handover trigger condition of a candidate target cell. For example, the timer information includes at least one of a first timer 1 and a second timer 2, where the first timer 1 indicates a validity period of a dedicated Random Access Channel (RACH) resource for the conditional handover in the candidate target cell. If the first timer 1 expires, the dedicated RACH resource for the conditional handover in the candidate target cell will be unavailable. The second timer 2 indicates a validity period when the UE is allowed to perform a conditional handover in the candidate target cell. If the second timer 2 expires, the UE cannot initiate the conditional handover to the candidate target cell.

Further, the priority information may be the remaining duration of the timer information of the candidate target cell, that is, the longer the remaining duration of the timer of the candidate target cell, the higher the priority level of the candidate target cell. The timer information may be the first timer 1 or the second timer 2. In some embodiments, the UE starts the above-mentioned timer when receiving the timer information in the conditional handover command information. The UE may select the candidate target cell with the longest remaining duration of the first timer 1 as the target cell, and perform the cell handover, or may select the candidate target cell with the longest remaining duration of the first timer 2 as the target cell, and perform the cell handover.

For example, if the remaining duration of the first timer 1 is used to determine the priority levels, when the remaining duration of the first timer 1 of cell 1 is 10 ms, and the remaining duration of the first timer 1 of cell 2 is 20 ms, it is determined that the priority level of cell 2 is higher than the priority level of cell 1, and the UE selects cell 2 as the target cell for cell handover.

If the remaining duration of the first timer 2 is used to determine the priority levels, when the remaining duration of the first timer 2 of cell 1 is 10 ms, and the remaining duration of the first timer 2 of cell 2 is 20 ms, it is determined that the priority level of cell 2 is higher than the priority level of cell 1, and the UE selects cell 2 as the target cell for cell handover.

Figure 2:
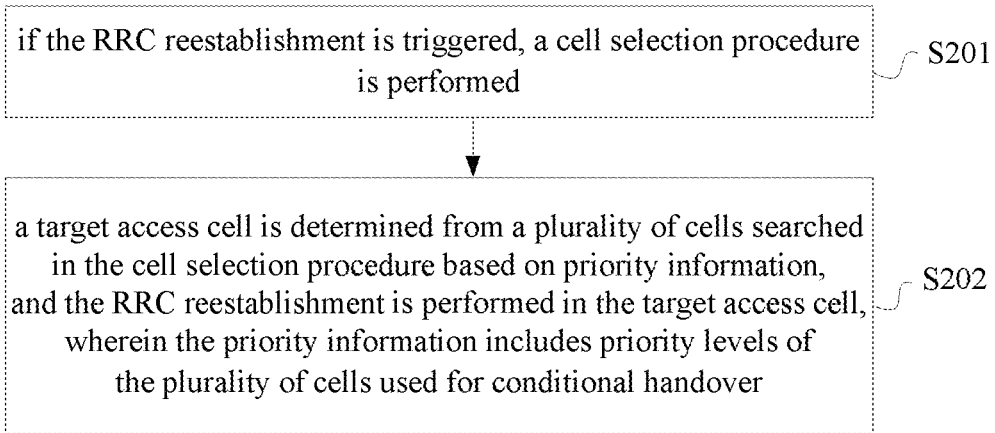
FIG. 2 is a flow chart of an RRC reestablishment method according to an embodiment.

FIG. 2 is a flow chart of an RRC reestablishment method according to an embodiment. The method may include S201 and S202.

In S201, if the RRC reestablishment is triggered, a cell selection procedure is performed.

In some embodiments, a reason for triggering the RRC reestablishment may be a Radio Link Failure (RLF) or a cell handover failure, or one of following reasons: an integrity check failure, an RRC connection reconfiguration failure, a primary cell re-configuration with sync failure of the MCG.

In S202, a target access cell is determined from a plurality of cells searched in the cell selection procedure based on priority information, and the RRC reestablishment is performed in the target access cell, wherein the priority information includes priority levels of the plurality of cells used for conditional handover.

In the existing techniques, for an RRC reestablishment triggered after a handover failure, an RLF or other failures, after the RRC reestablishment is successful, another reestablishment may occur immediately due to an unsuitable target cell selected, thereby affecting communication of the UE.

In some embodiments, during the RRC reestablishment after a cell handover failure, an RLF, an integrity check failure, an RRC connection reconfiguration failure or a primary cell re-configuration with sync failure of the MCG, the target access cell for access may be determined based on the priority information. As the priority information can also be used for the cell handover before the RRC reestablishment, performing the RRC reestablishment based on the priority information that indicates which target cell is optimal may ensure quality of accessing the target cell.

In some embodiments, the cell with the highest priority level among the plurality of cells searched in the cell selection procedure may be determined as the target access cell.

Further, if there are multiple cells on the same frequency or on different frequencies with the same priority level, the cell with the highest signal quality may be selected as the target access cell for the RRC reestablishment. In other words, candidate target cells on the same frequency or on different frequencies with the same priority level correspond to different priorities according to signal quality, where the higher the signal quality, the higher the priority.

It could be understood that a specific method for determining the priority information may be referred to the foregoing embodiments, and is not described in detail here.

In the above embodiments, the UE may also refer to the priority information when performing RRC reestablishment, that is, determining the target access cell from the plurality of cells searched in the cell selection procedure based on priority information as an optimal target cell for handover, and performing the RRC reestablishment in the target access cell, thereby improving a success rate of RRC reestablishment, and avoiding frequent handovers.

Figure 3:
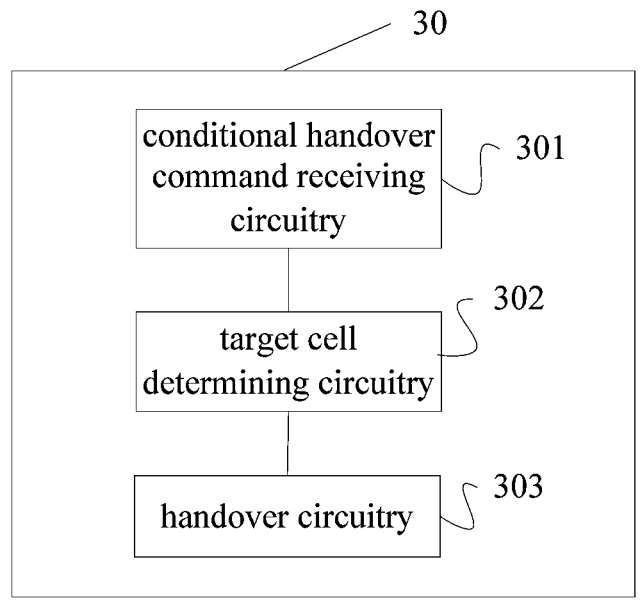
FIG. 3 is a structural diagram of a cell handover apparatus according to an embodiment.

FIG. 3 is a structural diagram of a cell handover apparatus according to an embodiment. Referring to FIG. 3, the cell handover apparatus 30 may include a conditional handover command receiving circuitry 301, a target cell determining circuitry 302 and a handover circuitry 303.

The cell handover apparatus 30 may be applied at a UE side.

In some embodiments, the conditional handover command receiving circuitry 301 is configured to receive conditional handover command information from a base station, wherein the conditional handover command information includes a handover trigger condition. The target cell determining circuitry 302 is configured to select a target cell from a plurality of candidate target cells that satisfy the handover trigger condition based on priority information, wherein the priority information includes priority levels of the plurality of candidate target cells. The handover circuitry 303 is configured to perform a cell handover operation from a current serving cell to the target cell.

In the embodiments, when the UE performs cell handover in response to the command of the base station, if there are a plurality of candidate target cells meeting the trigger condition, the final target cell for cell handover may be determined based on the priority levels of the plurality of target cells, and the final target cell may be the target cell with the highest priority level, so as to ensure that the UE can be handed over to an optimal target cell, which may avoid frequent handovers of the UE, improve efficiency of cell handover, and ensure communication quality.

In some embodiments, the conditional handover command information includes the priority information, and the priority information includes identities and corresponding priority levels of the plurality of candidate target cells, or frequencies and corresponding priority levels of the plurality of candidate target cells.

In the embodiments, the priority information may be carried in the conditional handover command information, and the UE can obtain the priority information while obtaining the trigger condition, thereby ensuring convenience of obtaining the priority information.

In some embodiments, the cell handover apparatus 30 further includes a priority information receiving circuitry configured to receive RRC signaling from the base station, where the RRC signaling includes the priority information.

In the embodiments, the UE may obtain the priority information through independent RRC signaling to ensure accuracy and timeliness of obtaining the priority information.

In some embodiments, the cell handover apparatus 30 further includes a priority information determining circuitry configured to determine the priority information based on signal quality of the plurality of candidate target cells.

Figure 4:
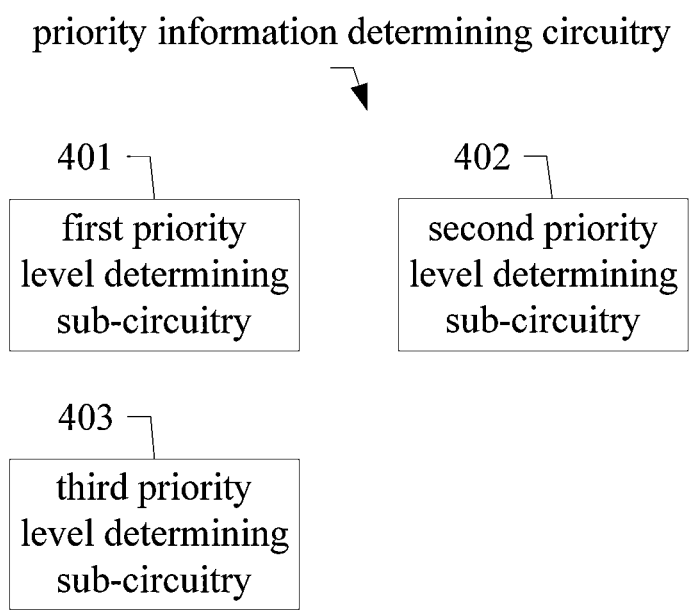
FIG. 4 is a structural diagram of a priority information determining circuitry in the cell handover apparatus as shown in FIG. 3 according to an embodiment.

Referring to FIG. 4, the priority information determining circuitry includes: a first priority level determining sub-circuitry 401 configured to determine the priority levels of the plurality of candidate target cells based on absolute signal quality of the plurality of candidate target cells, wherein the higher the absolute signal quality of the candidate target cell, the higher the priority level of the candidate target cell; a second priority level determining sub-circuitry 402 configured to determine the priority levels of the plurality of candidate target cells based on differences between signal quality of the plurality of candidate target cells and a signal threshold indicated by the handover trigger condition, wherein the greater the difference corresponding to the candidate target cell, the higher the priority level of the candidate target cell; or a third priority level determining sub-circuitry 403 configured to determine the priority levels of the plurality of candidate target cells based on numbers of beams whose signal quality exceeds a preset threshold in the plurality of candidate target cells, wherein the greater the number of beams corresponding to the candidate target cell, the higher the priority level of the candidate target cell.

In some embodiments, the cell handover apparatus 30 further includes a priority level determining circuitry configured to determine the priority levels of the plurality of candidate target cells based on remaining durations of timers in the conditional handover command information, wherein the longer the remaining duration, the higher the priority level of the candidate target cell.

In an embodiment, an RRC reestablishment apparatus is provided, including: a cell selection circuitry configured to perform a cell selection procedure if RRC reestablishment is triggered; and a target access cell determining circuitry configured to determine a target access cell from a plurality of cells searched in the cell selection procedure based on priority information, and perform the RRC reestablishment in the target access cell, wherein the priority information includes priority levels of the plurality of cells used for conditional handover. In some embodiments, a reason for triggering the RRC reestablishment may be a cell handover failure, an RLF, an integrity check failure, an RRC connection reconfiguration failure, a primary cell re-configuration with sync failure of the MCG.

In some embodiments, the UE may also refer to the priority information when performing RRC reestablishment, that is, determining the target access cell from the plurality of cells searched in the cell selection procedure based on priority information as an optimal target cell for handover, and performing the RRC reestablishment in the target access cell, thereby improving a success rate of RRC reestablishment, and avoiding frequent handovers.

More details of working principles and working modes of the cell handover apparatus 30 can be found in the above descriptions of FIG. 1 and FIG. 2, and are not described here.

In an embodiment of the present disclosure, a storage medium having computer instructions stored therein is provided, wherein when the computer instructions are executed, the above cell handover method as shown in FIG. 1 or the above RRC reestablishment method as shown in FIG. 2 is performed. The storage medium may include a Read Only Memory (ROM), a Random Access Memory (RAM), a magnetic disk or an optical disk. In some embodiments, the storage medium may be non-valatile memory or a non-transitory memory.

In an embodiment of the present disclosure, a UE including a memory and a processor is provided, wherein the memory has computer instructions stored therein, and when the processor executes the computer instructions, the above cell handover method as shown in FIG. 1 or the above RRC reestablishment method as shown in FIG. 2 is performed. In some embodiments, the UE includes but is not limited to a terminal device such as a mobile phone, a computer or a tablet.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A cell handover method, comprising:
   receiving, by a User Equipment (UE), conditional handover command information from a base station, wherein the conditional handover command information comprises a handover trigger condition;
   selecting, by the UE, a target cell from a plurality of candidate target cells that satisfy the handover trigger condition based on priority information, wherein the priority information comprises priority levels of the plurality of candidate target cells; and
   performing, by the UE, a cell handover operation from a current serving cell to the target cell,
   wherein prior to selecting a target cell from a plurality of candidate target cells that satisfy the handover trigger condition based on priority information, the method further comprises:
   determining, by the UE, the priority levels of the plurality of candidate target cells based on remaining durations of timers in the conditional handover command information,
   wherein each of the timers indicates a validity period to the handover trigger condition of the corresponding candidate target cell, and the longer the remaining duration, the higher the priority level of the candidate target cell.

2. The cell handover method according to claim 1, wherein the conditional handover command information comprises the priority information, and the priority information comprises identities and corresponding priority levels of the plurality of candidate target cells, or frequencies and corresponding priority levels of the plurality of candidate target cells.

3. The cell handover method according to claim 1, wherein before selecting a target cell from a plurality of candidate target cells that satisfy the handover trigger condition based on priority information, the method further comprises:
   receiving RRC signaling from the base station, wherein the RRC signaling comprises the priority information.

4. A non-transitory storage medium having computer instructions stored therein, wherein when the computer instructions are executed, the cell handover method of claim 1 is performed.

5. A User Equipment (UE) comprising a memory and a processor, wherein the memory has computer instructions stored therein, and when the processor executes the computer instructions, the cell handover method of claim 1 is performed.

6. A Radio Resource Control (RRC) reestablishment method, comprising:
   based on a User Equipment (UE) detecting a radio link failure, a cell handover failure, an integrity check failure, an RRC connection reconfiguration failure, or a re-configuration with sync failure of a master cell group,
   determining, by the UE, a target access cell from a plurality of cells searched in the cell selection procedure based on priority information, and performing, by the UE, an RRC reestablishment in the target access cell, wherein the priority information comprises priority levels of the plurality of cells used for conditional handover,
   wherein the priority levels of the plurality of candidate target cells are determined, by the UE, based on remaining durations of timers in the conditional handover command information,
   wherein each of the timers indicates a validity period to the handover trigger condition of the corresponding candidate target cell, and the longer the remaining duration, the higher the priority level of the candidate target cell.

7. A non-transitory storage medium having computer instructions stored therein, wherein when the computer instructions are executed, the Radio Resource Control (RRC) reestablishment method of claim 6 is performed.

8. A User Equipment (UE) comprising a memory and a processor, wherein the memory has computer instructions stored therein, and when the processor executes the computer instructions, the Radio Resource Control (RRC) reestablishment method of claim 6 is performed.

9. A cell handover apparatus in a User Equipment (UE), comprising:
   a conditional handover command receiving circuitry configured to receive conditional handover command information from a base station, wherein the conditional handover command information comprises a handover trigger condition;
   a target cell determining circuitry configured to select a target cell from a plurality of candidate target cells that satisfy the handover trigger condition based on priority information, wherein the priority information comprises priority levels of the plurality of candidate target cells;
   a handover circuitry configured to perform a cell handover operation from a current serving cell to the target cell; and
   a priority information determining circuitry, wherein the priority information determining circuitry comprises:
   a priority level determining sub-circuitry configured to determine the priority levels of the plurality of candidate target cells based on remaining durations of timers in the conditional handover command information, wherein each of the timers indicates a validity period to the handover trigger condition of the corresponding candidate target cell, and the longer the remaining duration, the higher the priority level of the candidate target cell.

10. The cell handover apparatus according to claim 9, wherein the conditional handover command information comprises the priority information, and the priority information comprises identities and corresponding priority levels of the plurality of candidate target cells, or frequencies and corresponding priority levels of the plurality of candidate target cells.

11. The cell handover apparatus according to claim 9, further comprising:
   a priority information receiving circuitry configured to receive RRC signaling from the base station, where the RRC signaling comprises the priority information.

* * * * *